Sept. 4, 1956
G. J. H. SAUSELE
2,761,363
PHOTOCOMPOSING MACHINE WITH AUTOMATIC
LINE REPEAT MECHANISM
Filed Jan. 26, 1955
11 Sheets-Sheet 1
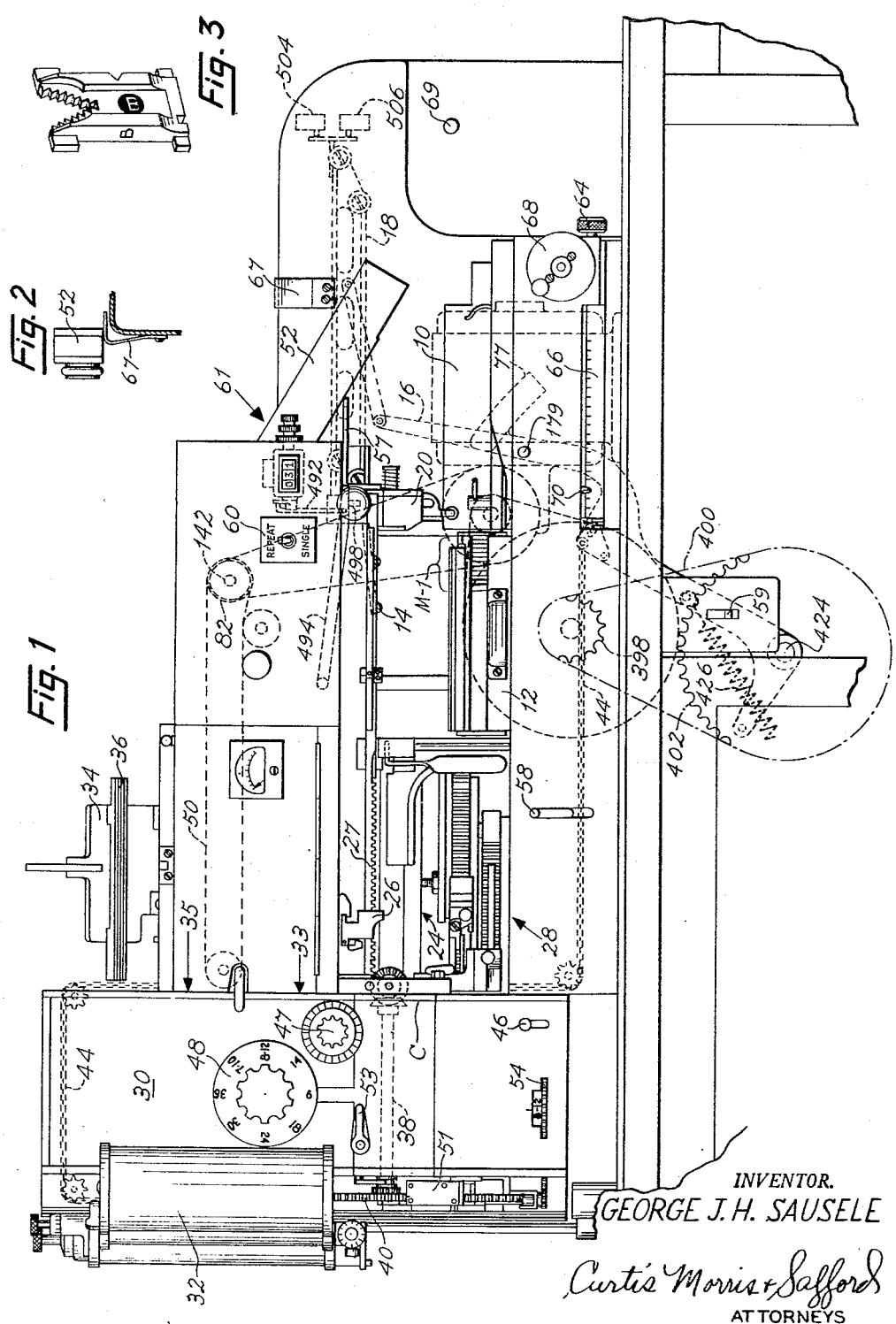
INVENTOR.
GEORGE J.H. SAUSELE
Curtis Morris + Safford
ATTORNEYS

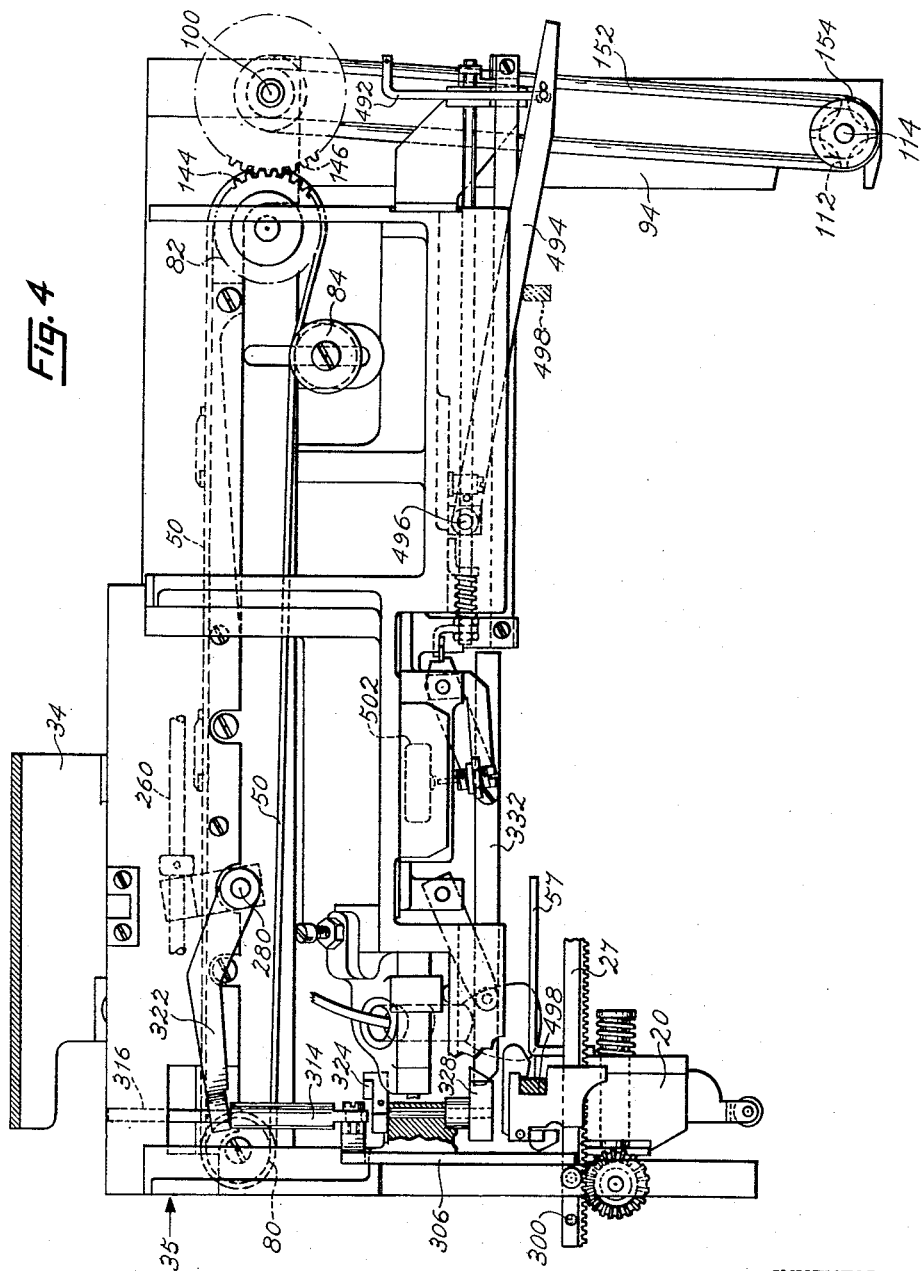

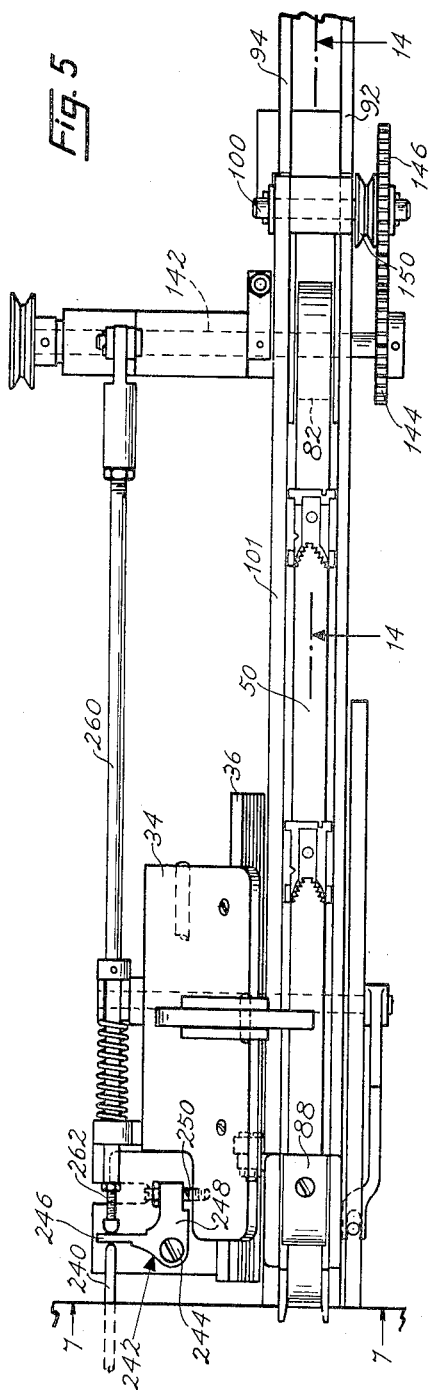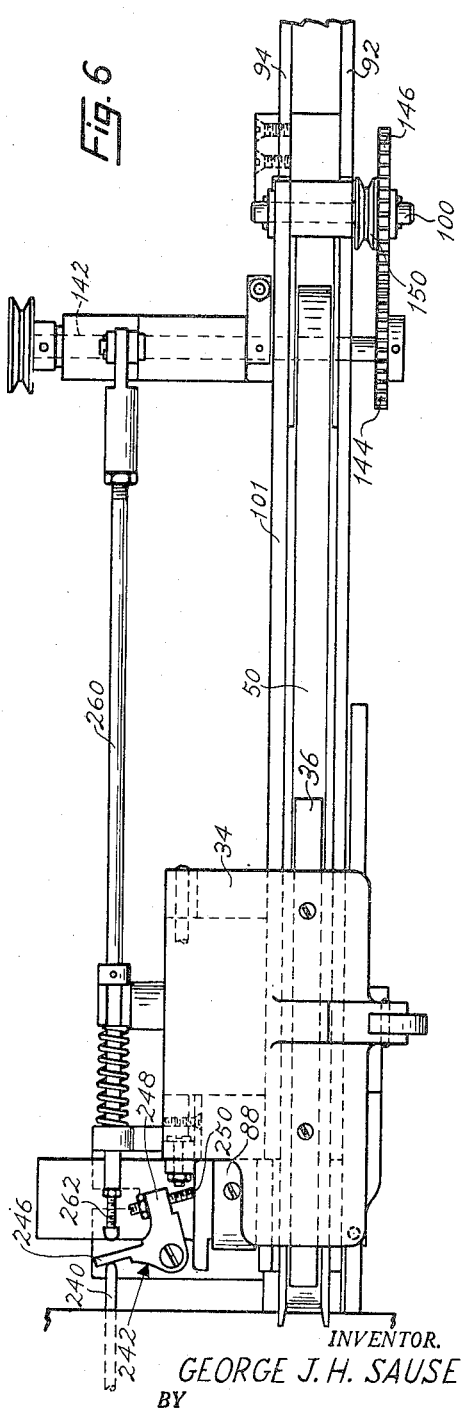

Sept. 4, 1956
G. J. H. SAUSELE
2,761,363
PHOTOCOMPOSING MACHINE WITH AUTOMATIC
LINE REPEAT MECHANISM
Filed Jan. 26, 1955
11 Sheets-Sheet 4
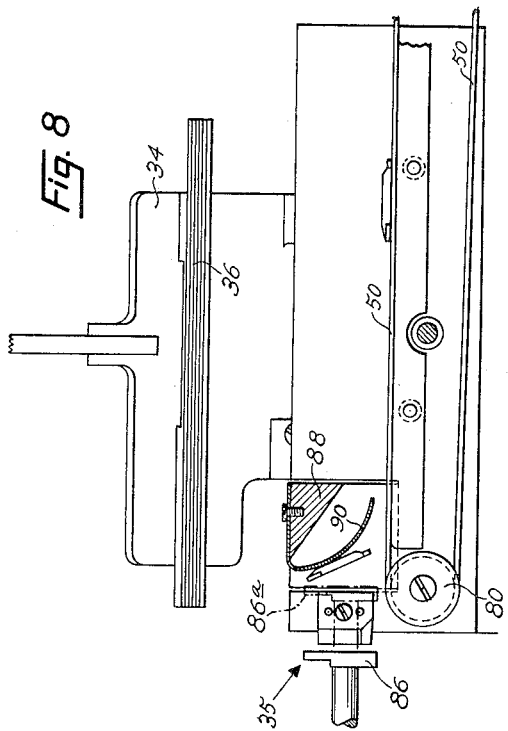
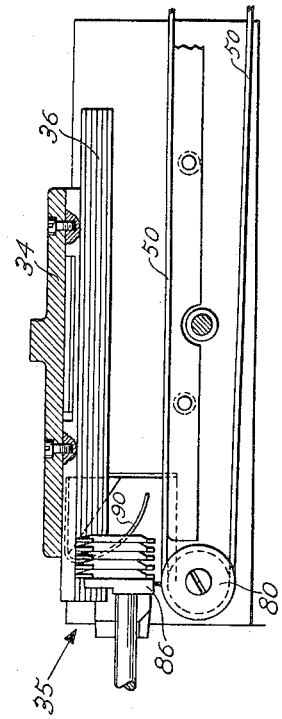
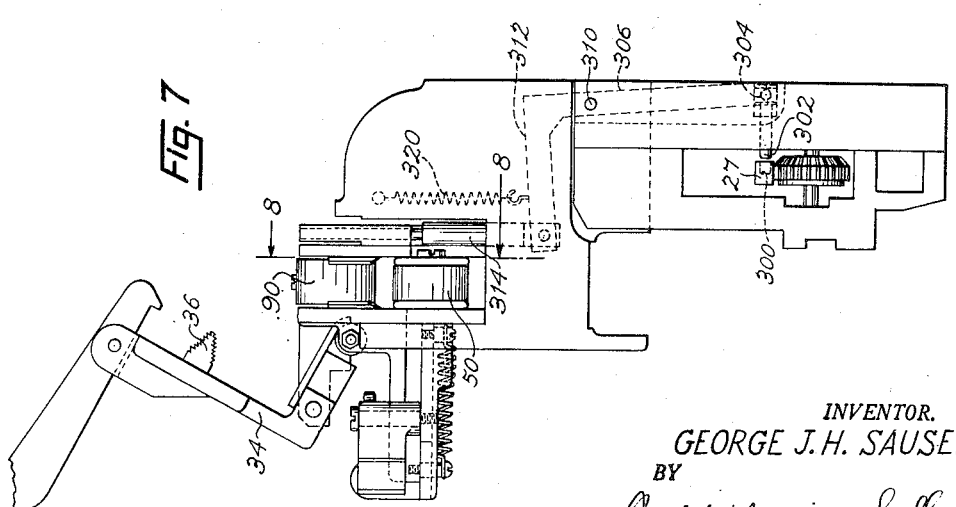
INVENTOR.
GEORGE J. H. SAUSELE
BY
Curtis Morris + Safford
ATTORNEYS

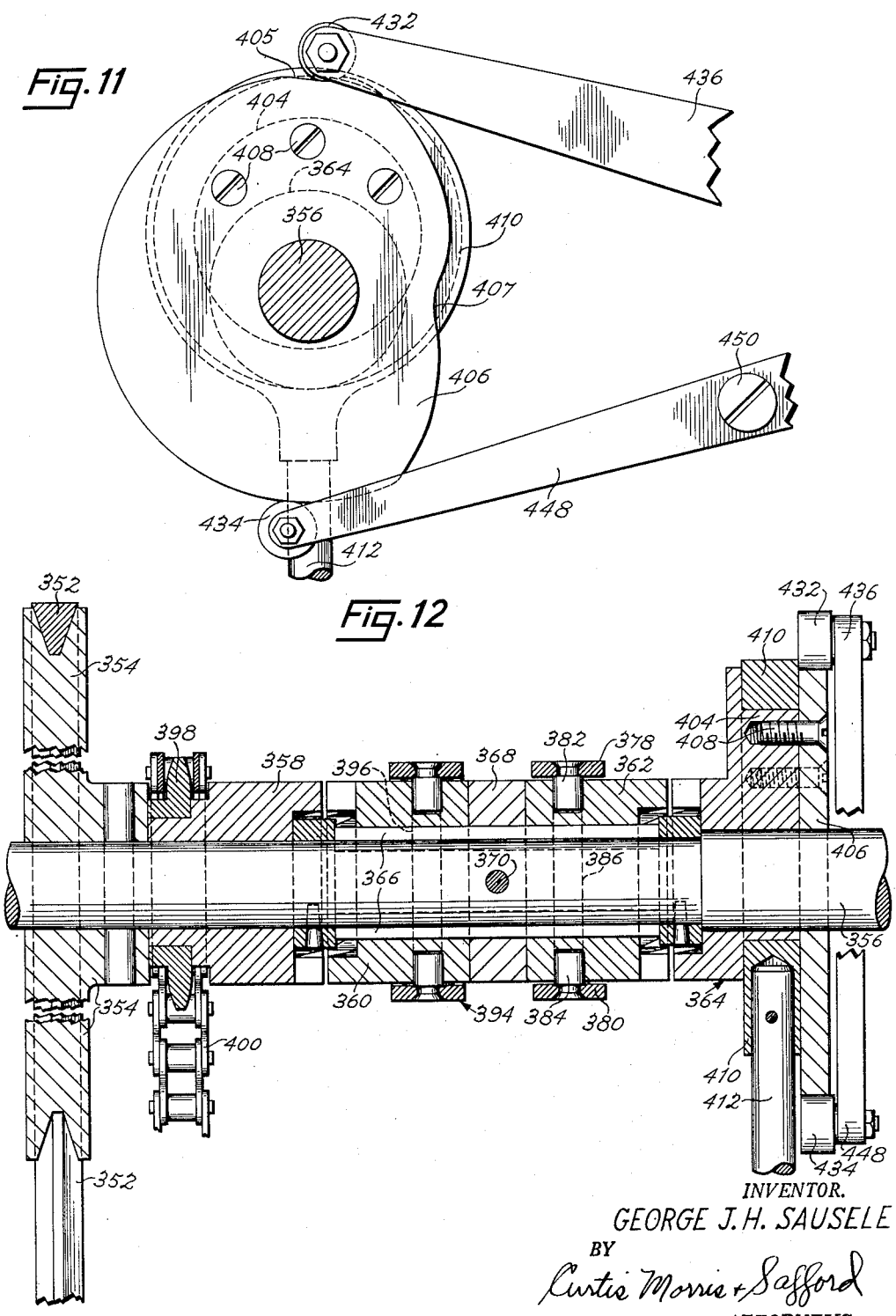

INVENTOR.
GEORGE J. H. SAUSELE
BY
Curtis, Morris + Safford
ATTORNEYS

Sept. 4, 1956                G. J. H. SAUSELE                2,761,363
            PHOTOCOMPOSING MACHINE WITH AUTOMATIC
                     LINE REPEAT MECHANISM
Filed Jan. 26, 1955                          11 Sheets-Sheet 8
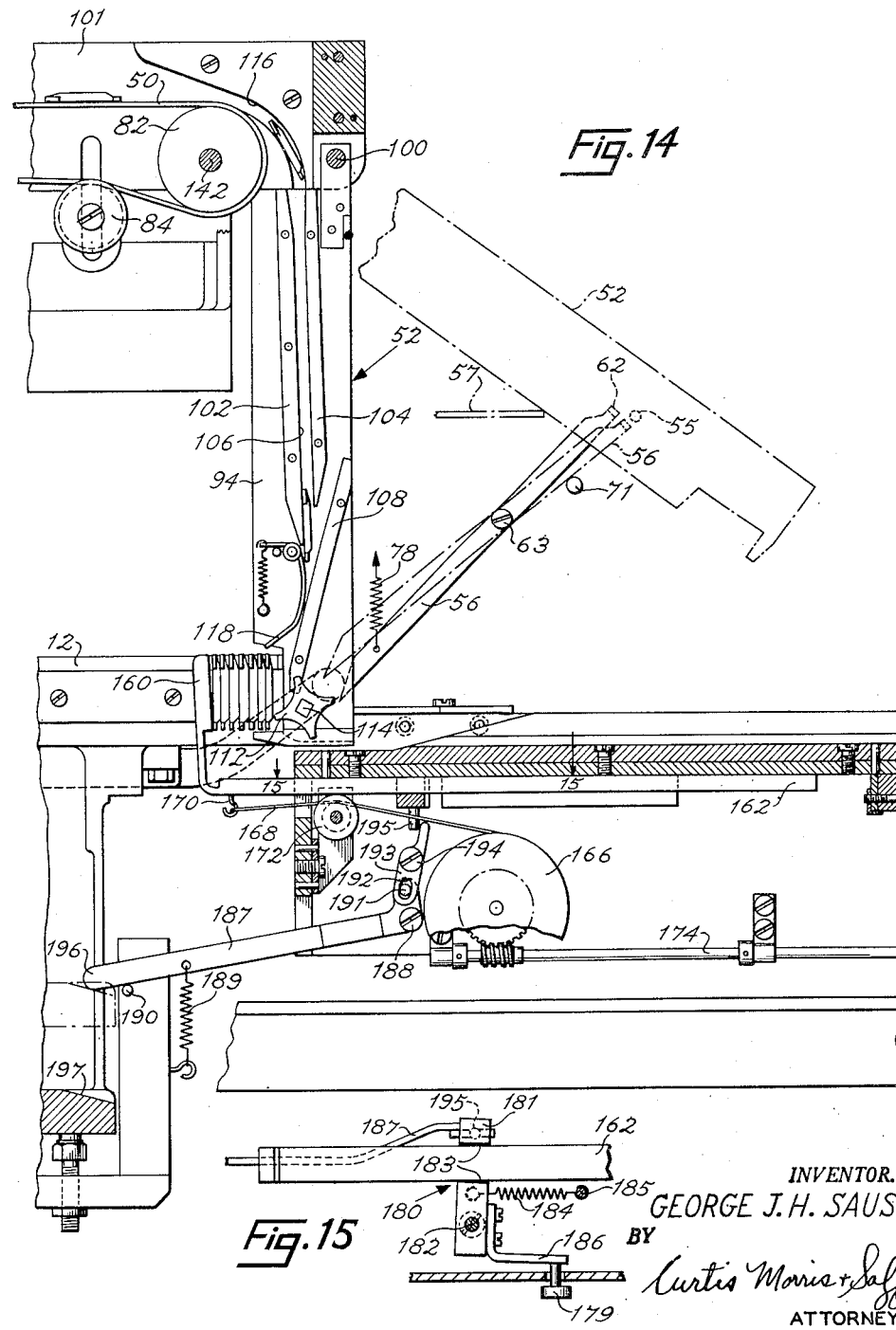
INVENTOR.
GEORGE J. H. SAUSELE
BY
Curtis Morris + Safford
ATTORNEYS Sept. 4, 1956  G. J. H. SAUSELE  2,761,363
PHOTOCOMPOSING MACHINE WITH AUTOMATIC
LINE REPEAT MECHANISM
Filed Jan. 26, 1955  11 Sheets-Sheet 9
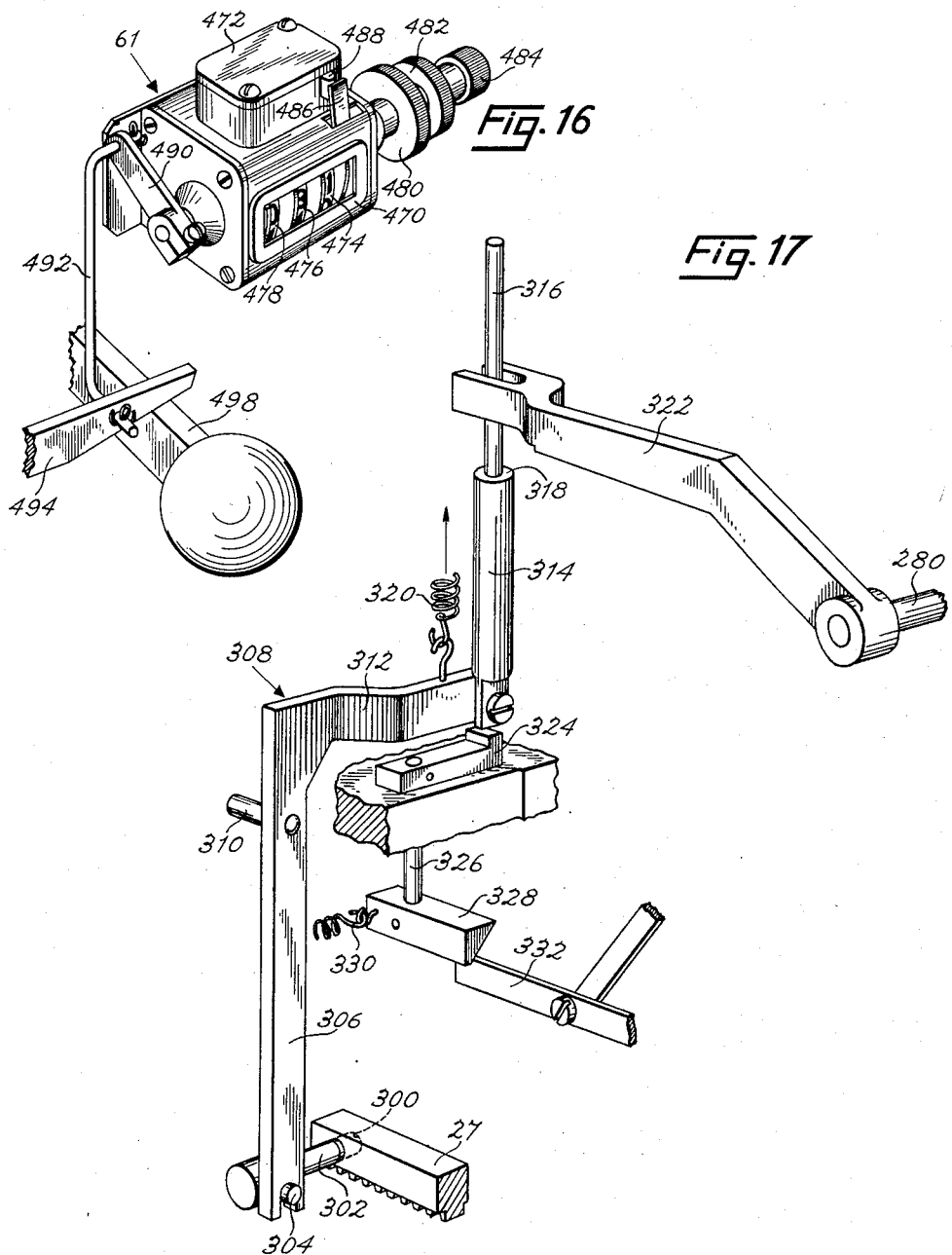
Inventor
GEORGE J. H. SAUSELE
By Curtis Morris + Safford
Attorneys

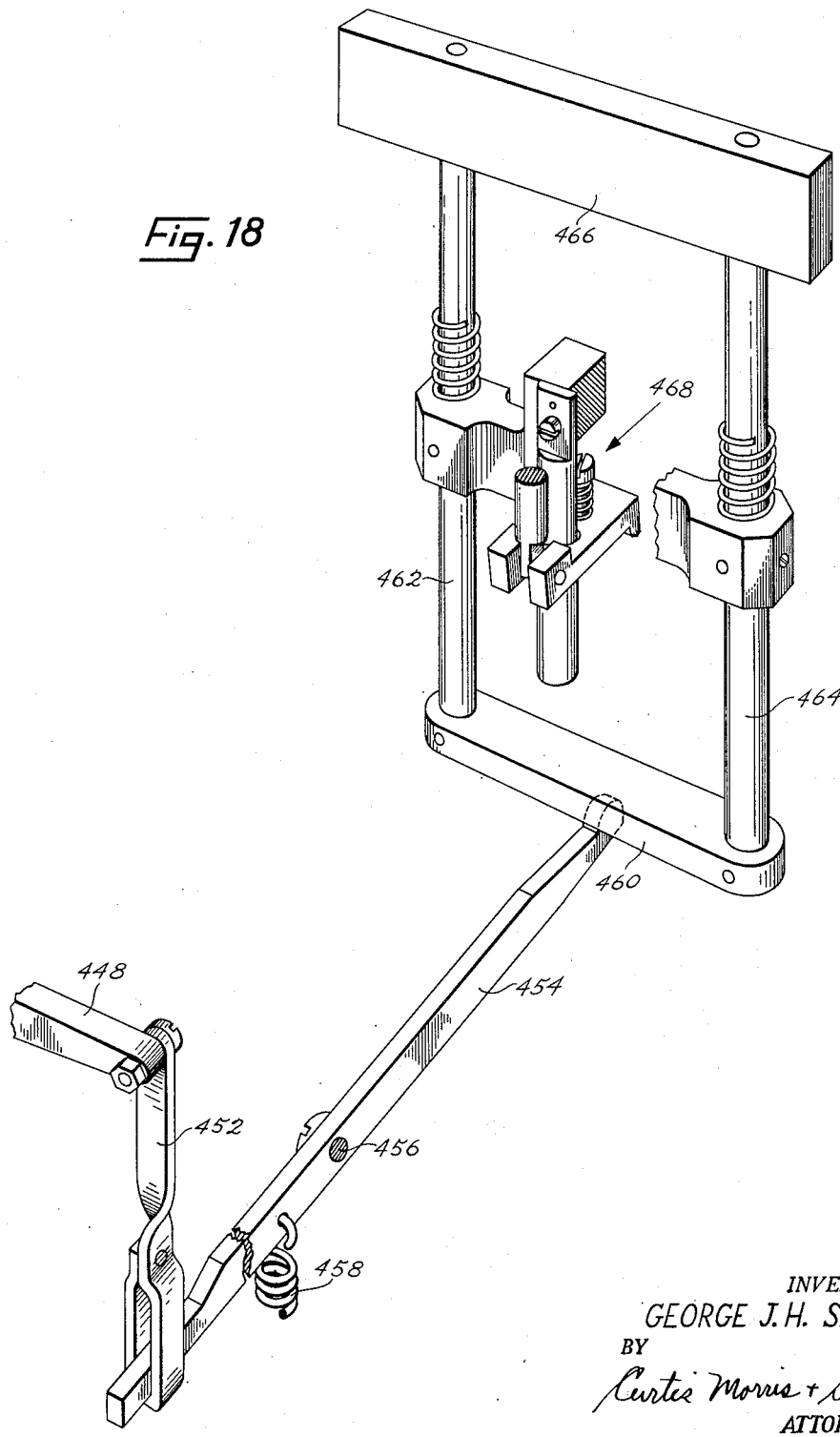

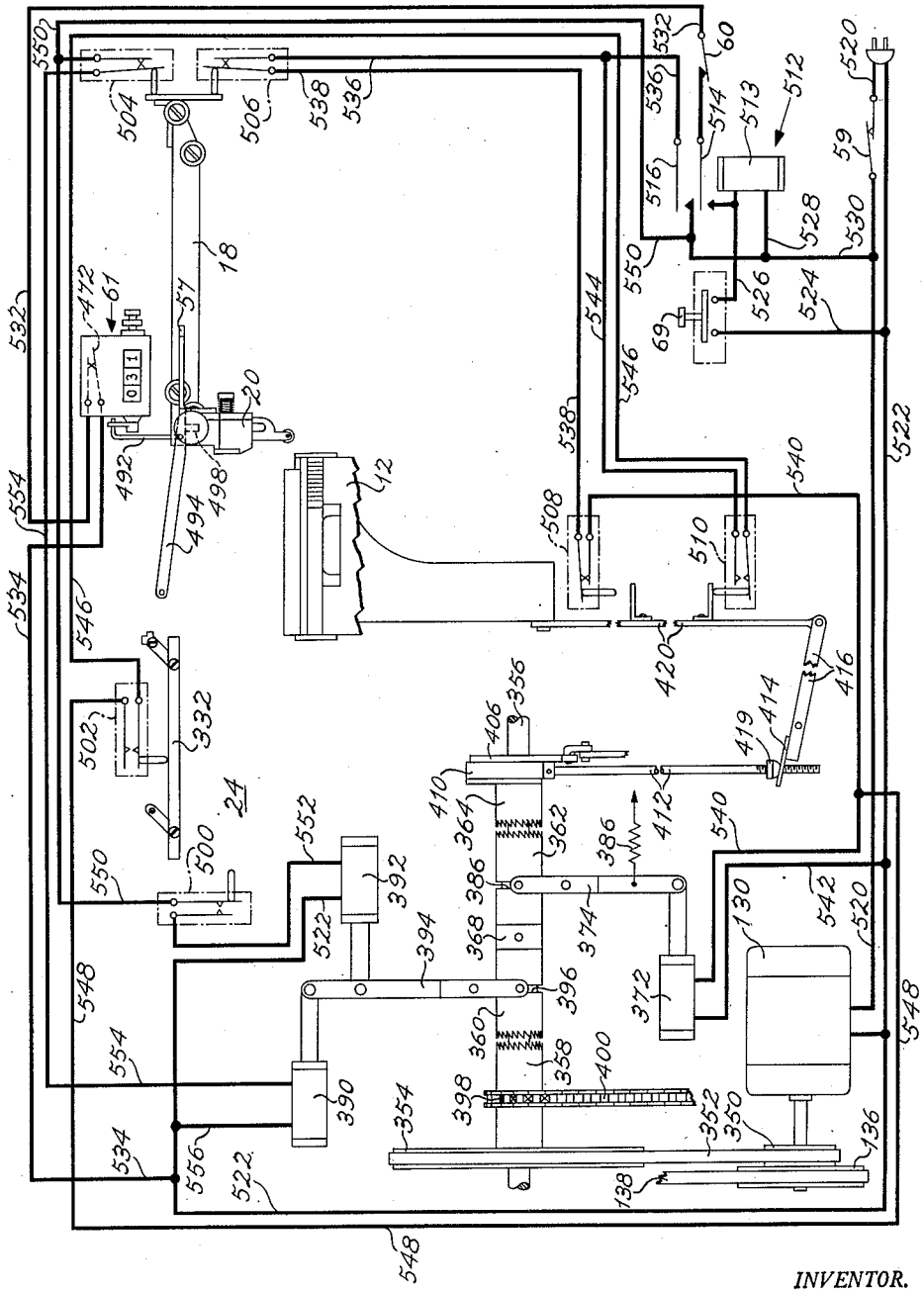

2,761,363
PHOTOCOMPOSING MACHINE WITH AUTOMATIC LINE REPEAT MECHANISM

George J. H. Sausele, West Hempstead, N. Y., assignor to Intertype Corporation, Brooklyn, N. Y., a corporation of New York Application January 26, 1955, Serial No. 484,254

13 Claims. (Cl. 95—4.5)

This invention relates generally to typographical machines for photographically producing on a sensitized film or paper lines of typed matter from composed lines of individual character-bearing elements or matrices. The film when developed may be used for example in preparing printing plates that are particularly suited for use in the off-set and gravure printing processes. The present invention is particularly concerned with a modification of and improvement in machines of this general character to facilitate automatic re-photographing of a composed line of matrices as many times as may be desired. The apparatus of the present invention is particularly useful when incorporated in photo-composing machines of the type disclosed and claimed in Freund Patent 2,672,795 and Freund application Serial No. 294,785 filed June 21, 1952, now Patent No. 2,704,014, and will be illustratively described in connection with such a machine, although as the description proceeds it will become apparent that the apparatus can be incorporated with advantage in other types of photo-composing machines as well.

In Freund Patent 2,672,795 a portable photocomposing machine is disclosed that is especially useful for certain special printing work wherein direct hand composition as distinguished from keyboard composition is either preferable or necessary. For example, such machines are useful for advertising composition where relatively small amounts of text are to be used in conjunction with illustrations, as well as in the printing of such items as greeting cards, matchbooks, labels and lines of text or single words to be applied to maps and the like.

In certain types of compositions a particular composed line may be repeated several times. For example in Freund Patent 2,698,562 there is disclosed a method of making various business forms such as ruled forms, and in the preparation of such forms it becomes desirable to re-photograph the characters of a given composed line of elements many times. In Freund application 294,785 a machine is disclosed which can be adjusted to cause a composed line of matrices to be recirculated and re-photographed. However, with the machine of this Freund application, manual manipulation of the parts of the machine is required each time a composed line is photographed, and hence the machine must be continuously tended by an operator during line-repeat operation.

It is an object of the present invention to provide a photo-composing machine of the general type referred to above which provides in a fully automatic manner for the recirculation and rephotographing of composed lines of matrices. It is another object of the invention to provide a machine of this kind that can be pre-set to perform a predetermined desired number of line-repeat operations and will re-photograph a composed line of elements the number of times for which the machine is pre-set in a fully automatic manner. Other objects of the invention will be in part obvious and in part pointed out hereafter.

The many objects and advantages of the present invention can best be understood and appreciated by reference to the accompanying drawings which illustrate a photocomposing machine incorporating a preferred embodiment of the present invention and wherein:

Figure 1 is a general front elevation of the machine;

Figure 2 is an end view of the matrix-return chute showing the upper latch therefor;

Figure 3 is a perspective view of one of the matrices;

Figure 4 is a front view of the central portion of the machine as shown in Figure 1 but with portions of the machine removed to show the matrix re-circulating mechanism;

Figure 5 is a top plan view of the central portion of the machine with the accumulator bar plate in its raised position and showing the mechanism whereby downward movement of the matrix return chute initiates operation of the camera mechanism;

Figure 6 is a view similar to Figure 5 but with the accumulator bar plate in closed position;

Figure 7 is a vertical section taken on the line 7—7 of Figure 5 and showing one end of the matrix-return conveyor, the guide block for guiding matrices onto the conveyor and the interconnection between the guide block and accumulator bar plate, as well as portions of the feed rack lock actuating mechanism;

Figure 8 is a vertical section taken on the line 8—8 of Figure 7 and further showing the matrix-return conveyor and guide block;

Figure 9 is a view similar to Figure 8 but with the accumulator bar plate in its lower position;

Figure 11 is a rear end view of the cam shaft with the shaft itself shown in section and the cam shown in elevation;

Figure 12 is an axial section through the cam shaft taken on the line 12—12 of Figure 10 but with the shaft itself shown in elevation;

Figure 14 is a vertical section taken essentially on the line 14—14 of Figure 5 and showing the interior of the matrix-return chute as well as the assembler slide and certain associated mechanism;

Figure 15 is a horizontal section taken on the line 15—15 of Figure 14 and showing the details of the assembler slide brake;

Figure 16 is a perspective view of the cycle controller and its actuating mechanism;

Figure 17 is a perspective view of the feed rack lock and its actuating mechanism;

Figure 18 is a rear perspective view of the actuating mechanism for the line shortage measuring and justifying apparatus; and Figure 19 is a wiring diagram of the control circuit of the machine.

Figure 10:
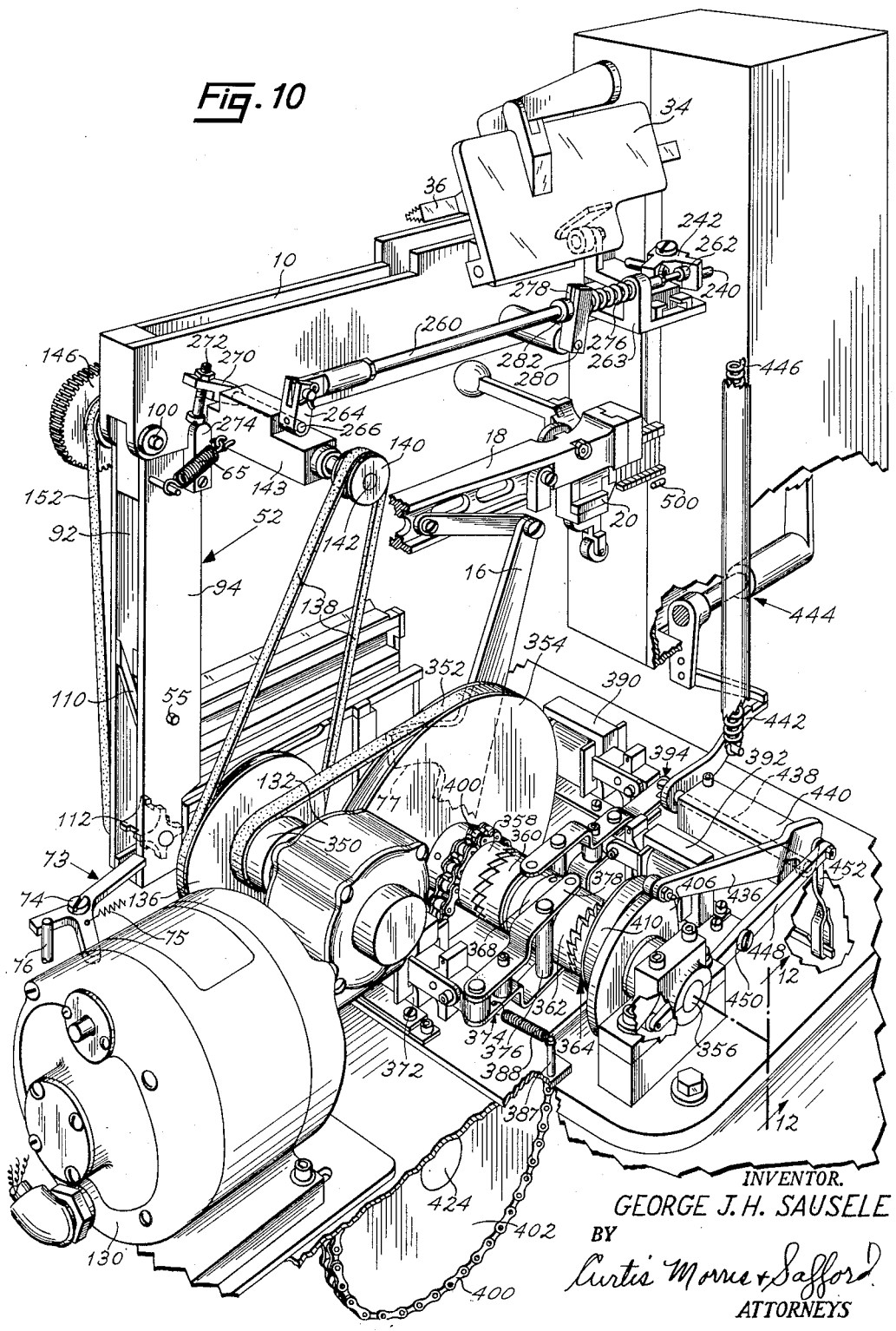
Figure 10 is a rear perspective view of the central portion of the machine showing the motor, cam shaft and solenoid operated clutches that cooperate to actuate various parts of the machine in proper sequence as will be described.

The machine of the present application is in many of its details similar to the machines disclosed in Freund Patents 2,552,882; 2,645,168; 2,672,795 and Freund application Serial No. 294,785 filed June 21, 1952, referred to above. It does not appear that any useful purpose would be served by repeating herein the rather lengthy description of these details and accordingly frequent reference will be made in the following description to these patents and applications.

Composition of the desired type matter with the present machine is effected by assembling character-bearing matrices such as that illustrated in Figure 3 into a line of desired length and then individually photographing on a sensitized surface the characters of successive matrices of a composed line to produce lines of the type matter on the sensitized surface. Matrices of the type shown in Figure 3 have been described in Freund Patent 2,552,882 and elsewhere and hence need not be described in detail herein. Such matrices have a thickness that is proportioned to the set-wise width of the characters as they bear and therefor the matrix thickness can be used to regulate film movement to secure proper spacing of the characters in a line of type matter.

Brief description of machine

The operation of the machine will first be generally described with reference to Figure 1 of the drawings and thereafter portions of the machine will be described in detail. Referring particularly to the right-hand portion of Figure 1, in using the present machine a line of matrices M–1 is hand-composed in a composing stick 10 which is capable of being removed from the machine and inserted therein in the manner described in Freund Patent 2,672,795. The composed line of matrices M–1 is manually shifted to the left into an elevator 12 which is automatically raised to an upper position at which it trips a line-follower release lever 14. As described more fully in Patent 2,552,882 tripping of the lever 14 releases a line delivery lever 16 which is urged to the left by a spring 426 and is connected through a line delivery slide 18 to a line follower 20 that pushes the composed line of matrices from the elevator along a feed channel or track to a justification station 24. As the line follower 20 reaches the justification station 24 it engages and is latched to a line length-determining member 26 carried on a feed rack 27.

At the justification station 24, a line measuring and justification control mechanism generally designated 28 is provided which is similar to the mechanisms disclosed in Freund Patents 2,645,168 and 2,672,795, but differs from these prior mechanisms in that it is automatically actuated by apparatus described in detail hereafter. The mechanism 28 cooperates with parts of the line-follower 20 to measure the difference between the actual length of the composed line of matrices and the desired line length to determine what will hereafter be referred to as the "line shortage" and modifies movement of the film in such manner that this difference or shortage is distributed over the line of type matter produced on the film or over a pre-selected portion thereof all as described in Freund Patent 2,645,168. As an incident of the line shortage measuring operation the composed line of matrices at station 24 is urged to the left against the end wall C that forms part of the camera housing.

When the justification measurement has been completed the characters on the matrices are individually photographed by a camera mechanism generally designated 30 that includes a vertically movable film holder 32. As described in Patent 2,552,882, the camera mechanism includes a pair of endless conveyors which pick up the matrices one at a time and carry them from the justifying station 24 upward to a photographing station 33, whereat the character on the matrix is photographed, and then to a discharge station 35. As each matrix is removed for photographing, the line delivery lever 16 and line follower 20 urge the line to the left to cause the next matrix to bear against the wall C.

Feed rack 27, as described in Patent 2,552,882, is connected by a gear and shaft assembly 38 with a vertical rack 40 on which the film holder 32 normally rests during photographing. Also the feed rack 27 is connected by member 26 with the line follower 20 and hence as elements are withdrawn from the line during photographing the rack moves leftward in a step-wise fashion, thus causing the film holder 32 to move downward in a step-wise manner as each element is moved from the line to the photographing station. The amount of downward movement of the film holder comprising each step depends upon the set-wise width of the character being photographed and also upon the line shortage referred to above. As explained in Freund Patent 2,645,168 in certain cases, as for example where tabular matter is being composed, it is desirable that no justifying correction be applied to the tabular matter and hence during the photographing of such tabular matter, each step movement of the film holder 32 is proportioned only to the width of the character being photographed.

The machine of the present invention, like that of Freund application Serial No. 294,785, is provided with apparatus for returning the matrices one at a time from discharge station 35 to elevator 12. For this purpose a horizontal matrix return conveyor 50 is provided that extends from a point near the discharge station 35 to a point substantially above the elevator 12. Cooperating with the right-hand end of conveyor 50 there is a matrix-return chute 52 that is pivotally mounted at its upper end for swinging movement from an inactive position as shown in Figure 1 to a substantially vertical element delivery position shown in Figure 14 wherein its lower end is close to elevator 12. When the chute is in its element delivery position it can receive matrices from the end of the conveyor 50 and guide them downwardly into elevator 12 in the proper order for re-photographing. When the line of matrices has been reassembled in elevator 12, the elevator is again raised automatically.

The machine of the present application, like that of Freund Patent 2,672,795, is provided with an accumulator bar plate 34 and accumulator bar 36 which may be positioned to receive matrices discharged at station 35, if desired. However, the matrices as they accumulate on bar 36 are in reverse order and hence it is usually not convenient to employ accumulator bar 36 where a line is to be re-photographed.

Upon completion of the photographing of a line of matrices the machine is automatically re-set to photograph the next line. The steps involved in re-setting the machine are generally described in Freund Patent 2,672,- 795 although the structure provided in the present machine for effecting these operations is different from that of the Freund patent and will be described in detail hereafter. In the present machine when photographing of a line has been completed the delivery lever 16 and line-follower 20 are automatically retracted to the right, i. e. to their position as shown in Figure 1, and also through the medium of a chain 44, the film holder 32 is raised to its upper position. Feed rack 27 is also retracted thus raising rack 40 to its upper position to support film holder 32 during the next photographing operation. The film is then advanced one line space within the film holder 32 to place it in condition too for photographing the characters of another line of elements, or for re-photographing a recirculated line of elements.

The machine as shown in Figure 1 includes various adjusting members for adjusting the machine in various respects. The manner in which these adjusting members operate is essentially disclosed in Freund Patents 2,552,- 882 and 2,672,795. Hence the operation of these adjusting members will not be described herein, but their function will be briefly referred to. Beginning near the left-hand side of Figure 1, these adjusting members include a line-space setting dial 47 whereby the amount of film movement per line may be adjusted; a lens selecting dial 48 whereby the degree of magnification of the characters of the character-bearing elements can be varied; a gear box 51 which is exchangeable with other gear boxes to vary the relationship between movement of feed-rack 27 and movement of film holder 32; a release lever 53 which is movable to release gear-box 51 from its gear and shaft assembly 38; a knurled disk 54 whereby the initial position of film holder 32 may be adjusted to provide for accurate alignment of the left-margin of the column of type matter with different degrees of magnification; and a lever 46 by means of which line-advancing movement of the film can be manually effected. Going on to the central portion of the machine there are a control lever 58 to provide for justification or for aligning a short line of type matter at either the left or right margin as desired; a main switch 59 near the bottom of the machine for controlling the power supply to the machine, a snap switch 60 near the top of the machine by means of which the machine can be set for single-line or repeat operation; a cycle controller 61 by means of which the machine can be set to re-photograph a given line of matrices a predetermined number of times; and a push button 179 by means of which the brake on the assembler slide can be manually released. At the right-hand side of the machine there are knob 64 for rotating a drum scale 66 having various point-size scales thereon; a hand wheel 68 which when rotated sets an index 70 relative to the scale 66 to indicate the point size of the desired line, and also sets the line-length determining member 26 to the proper position on feed rack 27; and a push button 69 by means of which the machine is started after a composed line of matrices has been inserted in elevator 12.

*Matrix-return mechanism*

The present machine includes apparatus for returning the matrices from the discharge station 35 to the elevator 12 in proper sequence for re-photographing to repeat a line. Referring to Figure 4 of the drawings the conveyor 50 in the form of an endless belt is mounted for rotation on a pair of spaced pulleys 80 and 82, the pulley 80 being located close to the discharge station 35 and the pulley 82 being located approximately above the right-hand end of the elevator 12. The belt is maintained tight on the pulleys 80 and 82 by a conventional belt-tightening device 84.

Referring now to Figure 8 of the drawings, the matrices are discharged from the discharge station 35 by a pusher element 86, the operation of which is described in Patent 2,552,882. The advanced position of pusher element 86 is indicated in dotted lines and designated by the numeral 86a. Located above the conveyor 50 near the discharge station 35 is a guide-block 88 having a curved deflecting member 90 (see also Figures 7 and 9) that guides or deflects each matrix into the desired horizontal position on the conveyor 50. As indicated in Figure 8, the deflector member 90 operates to cause the bottom of each matrix to become the leading edge of the matrix on the conveyor 50.

Turning now to Figure 14 of the drawings, the matrices are transferred from conveyor 50 to the elevator 12 through a chute 52 which (see also the left-hand side of Figure 10) comprises a pair of spaced parallel sides 92 and 94. The chute is pivotally mounted on a shaft 100 which is in turn supported in a channel 101 forming part of the frame of the machine and is adapted to be rotated to any of three positions, namely, an inactive position where it is held by a latch 67 shown in Figures 1 and 2; a retracted position shown in full lines in Figure 1 and dotted lines in Figure 14; and a substantially vertical element delivery position shown in Figures 14 and 10. As shown in Figure 10 the chute 52 is urged toward its element delivery position by a spring 65 which is secured at its ends to the chute and to a fixed block 143.

Referring to Figures 1 and 14, the chute 52 is held in its retracted position by an angle plate 57 secured to the delivery slide 18 until the delivery slide and line follower shift a composed line of matrices to the justification station 24. When the plate 57 moves away from chute 52, the chute moves a short distance downward until a pin 55 secured to the rear side of the chute engages the upper end 62 of a latch lever 56 that is pivoted at 63. The lever 56 is urged clockwise around pivot 63 by a spring 78 and clockwise movement of the lever is limited by a stop 71. The stop 71 is so located that when lever 56 rests against the stop its upper end is in a position to intercept pin 55.

Figure 13:
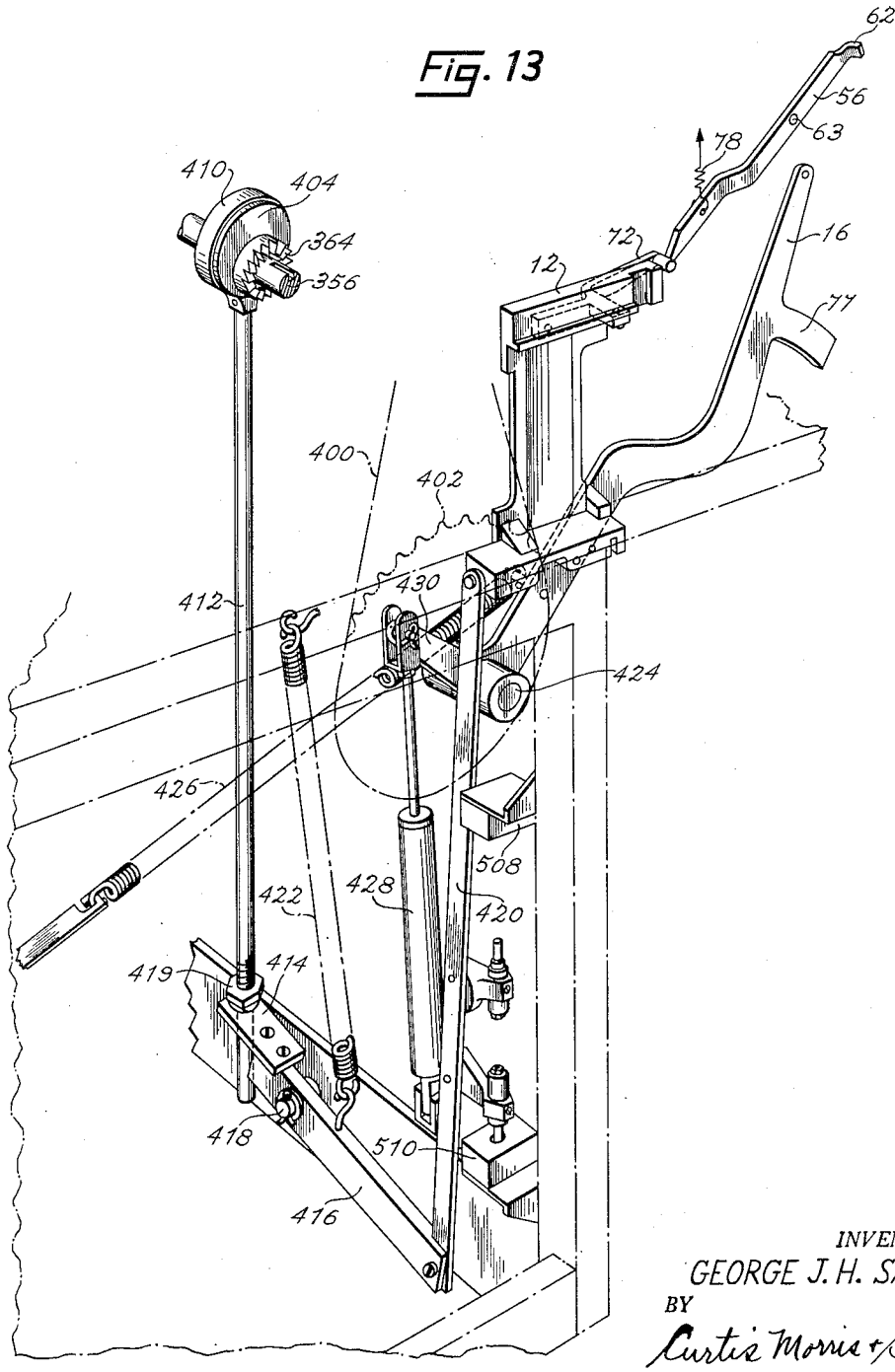
Figure 13 is a perspective view of the elevator and its actuating mechanism.

Turning now to Figure 13 and more particularly to the upper right portion thereof, the lower end of latch lever 56 is positioned under an arm 72 secured to elevator 12. Thus when the elevator descends after having delivered a composed line to the delivery channel, the arm 72 engages latch lever 56 and rotates it to disengage end 62 of the lever from the chute pin 55, thereby permitting chute spring 65 to pull the chute downwardly to its element delivery position.

Referring to Figure 10, the chute is latched in its element delivery position by a three-armed latch 73 which is pivotally mounted at 74. Latch 73 is urged counter-clockwise by a spring 75 and its counter-clockwise movement is limited by a stop 76. In Figure 10 the latch 73 is shown engaged with chute 52. After the composed line has been photographed and as the line delivery lever is retracted, a projecting arm thereof 77 engages and rotates latch 73 to unlatch chute 52. Thereafter plate 57, as described above and shown in Figures 1 and 14, moves the chute up to its retracted position.

Referring now particularly to Figure 14, secured to the side 94 of chute 52 is a pair of spaced guide members 102 and 104 that define a guide groove 106. The other side 92 of chute 52 is provided with a similar guide groove (not shown). Below the lower end of guide groove 106 is a deflector 108 positioned at such an angle as to guide the matrices toward the elevator 12. A similar deflector 110 (see Figure 10) is secured to the side 92 of chute 52. At the bottom or element delivery end of chute 52 there is a star wheel 112 mounted on a shaft 114 that is rotated by means described hereafter to insure proper positioning of the matrices in the elevator.

Still referring to Figure 14, the matrices are carried by the conveyor 50 to a guide passage 116 formed in the channel 101 and are guided to the upper end of guide groove 106 and the corresponding groove on the side 92 of the chute 52. As the matrices descend through the chute they are guided by the guide groove 106 and the corresponding groove on the side 92 of the chute 52 to the deflectors 108 and 110, and pass between the deflectors and a spring-biased buffer 118 to the star wheel 112 that drives each matrix into the elevator 12.

Reverting now to Figure 10, power to operate the conveyor 50 and star wheel 112 is supplied from an electric motor 130 shown at the lower left-hand corner of Figure 10. The motor is connected through reduction gearing 132 to a pulley 136 which through a belt 138 and pulley 140 drives a shaft 142 mounted for rotation in the fixed block 143 that is secured to the channel 101. Referring to Figure 5, the shaft 142 extends through pulley 82 and is fixed thereto so that rotation of shaft 142 drives pulley 82 and conveyor 50. Also fixed to shaft 142 near the front end thereof is a gear 144 that meshes with a gear 146 journalled on shaft 100 mounted in the channel 101. Fixed to the gear 146 is a pulley 150 which (see Figure 4) is connected by a belt 152 to a second pulley 154 at the discharge end of chute 52. The pulley 154 is secured to shaft 114 on which the star wheel 112 is mounted, and thus the star wheel is driven through gears 144 and 146, pulley 150, belt 152, pulley 154 and shaft 114.

Reverting to Figure 14, the matrices fed into elevator 12 by star wheel 112 are assembled against a line-resistant finger 160 that forms part of an assembler slide 162 which is urged toward the right by a spiral spring device 166 similar to those used on typewriters. The free end 168 of spring device 166 is connected to a hook 170 secured to the lower left-hand end of the assembler slide 162 and passes over an idler roller 172 mounted between hook 170 and spring device 166. Tension of the spring within the device 166 can be adjusted by rotation of an adjusting rod 174.

Referring to Figure 15 as well as to Figure 14, the assembler slide 162 is provided with a brake generally designated 180 and comprising a brake arm 181 mounted for pivotal movement about a pin 182. The slide 162 passes through an opening 183 in the arm 181 and the opening 183 is slightly wider than the slide. The brake arm 181 is urged clockwise by a spring 184 that is connected to the arm and a fixed pin 185. The construction is such that the slide 182 can be readily moved to the left but is held against movement to the right by the frictional forces exerted thereon by the left-front and right-rear portion of the side walls of opening 183.

The brake 180 can be released manually or automatically. Extending laterally near the front end of brake-arm 181 there is a tab 186 that can be manually depressed by a button 179 to rotate arm 181 a small amount counter-clockwise, thereby permitting spring 166 to retract slide 162. Referring particularly to the lower portion of Figure 14 the automatic release of rack 180 is effected by means of a lever 187 pivotally mounted at 188 and urged by a spring 189 against a stop 190. Lever 187 is provided at its right-end with a pin 191 that engages a slot 192 of rocker arm 193, pivoted at 194. The rocker arm 193 is so positioned that when lever 187 is raised the upper end of arm 193 engages a pin 195 fixed to the rear of brake arm 181 and rotates brake arm 181 counterclockwise to permit spring 166 to retract slide 162. The lever 187 is raised by upward movement of elevator 12. The left end 196 of lever 187 is positoned above a lever-actuating surface 197 of elevator 12 which engages the end 196 of lever 187 as the elevator 12 is raised. The end 196 of lever 187 is spaced sufficiently far above actuating surface 197 to permit the line of matrices to clear the top of the line-resistant finger 160 before the slide 162 is released.

*Camera starting and feed-rack release mechanism*

As described in Patent 2,552,882, the camera mechanism includes various operating parts that are driven by an electric motor through a clutch. After the composed line of matrices has been moved to the justification station 24 and the line measuring and justification control operations have been completed, the camera clutch is engaged to cause the matrices to be moved successively (see Figure 1) to the photographing station 33 and discharge station 35. Referring to Figure 5 of the drawings and more particularly to the left hand side thereof, engagement of the camera clutch is effected by moving a pin 240 to the left. In order to effect this leftward movement of pin 240 a bell-crank 242 is provided which is pivoted at 244 and comprises an arm 246 positioned to engage a pin 240 and an arm 248.

As pointed out above in the brief description of the machine, if it is desired to photograph a line of elements only once and collect the matrices on the accumulator bar 36, the accumulator bar plate 34 is moved to its lower position. As described in Freund application Serial No. 294,785 referred to above, the downward movement of accumulator bar plate 34 causes the guide block 88 to be withdrawn from the path of the discharged matrices and moves the accumulator bar into registry with the pusher 86 (see Figure 9). As shown in Figure 6, the guide block 88 as it is withdrawn engages a pin 250 on the arm 248 of bell-crank 242 and pivots the bell-crank to cause arm 246 thereof to depress the pin 240 and start the camera mechanism.

However, the present machine is especially useful for line-repeat operations, and under such circumstances the accumulator bar plate 34 remains in its upper position and a separate mechansm is provided for starting the operation of the camera. When the machine is arranged for line-repeat operation, starting of the camera is effected by the swinging movement of the matrix return chute 52 to its element delivery position. Still referring to Figures 5 and 6 of the drawings, bell-crank 242 can be rotated not only by the retraction of guide block 88 but also by means of a rod 260 having a head 262 at its left-hand end positioned to engage the arm 246 of the bell-crank.

Referring now to Figure 10 of the drawings, rod 260 is mounted for sliding movement near its right hand end in a post 263 which is fixed to the frame of the machine. The left hand end of the rod 260 is secured to a rocker arm 264 fixed to a shaft 266 that is mounted for rocking movement in block 143. Also fixed to shaft 266 there is a rocker arm 270 having a contact pin 272 at its outer end. The chute 52 is provided with a lug 274 positioned to engage the contact pin 272 as the chute approaches its element delivery position. Thus as the lower end of chute 52 approaches elevator 12, the lug 274 rocks the shaft 266 to cause the rod 260 to move to the right and thereby rotate bell-crank 242 to urge pin 240 to the right to start the camera mechanism.

Still referring to Figure 10 the rod 260 is urged to the left by a spring 276 surrounding the rod 260 and interposed between post 263 and the upper end of a lever arm 278 that is fixed to a shaft 280. A collar 282 is secured to rod 260 to maintain spring 276 under compression. It is apparent that as the lug 274 of chute 52 causes the rod 260 to move to the right, shaft 280 will be rotated in a clockwise direction at the same time that the camera starting pin 240 is actuated. Rotation of shaft 280 operates through mechanism now to be described to release the feed rack 27 at substantially the same time that the camera is started.

Referring to Figures 17 and 7 of the drawings the feed rack 27 is provided with a hole 300 that is adapted to be engaged by an axially movable locking bolt 302. The bolt 302 has a laterally extending pin 304 embraced by the lower forked end of one arm 306 of a bell crank lever 308 mounted for rotation about a pivot 310. The other arm 312 of bell-crank 308 is pivotally connected to the lower end of a rod 314 which is provided at its upper end with an extension 316 of reduced diameter that cooperates with the main part of rod 314 to define an annular shelf 318. Interconnecting the arm 312 of bell-crank 308 and the frame of the machine there is a spring 320 that is normally under tension and tends to urge the locking bolt 302 into the hole 300 of feed rack 27. Positioned to engage the shelf 318 of rod 314 there is a lever 322 that is secured to the front end of shaft 280 which was previously referred to in connection with Figure 10 of the drawings. As shown in Figure 13, the left-hand end of lever 322 is forked and embraces the extension 316 of rod 314.

In order to prevent inadvertent release of the fed rack 27, mechanism is provided for preventing withdrawal of the locking bolt 302 until after the composed line has been moved to the justification station 24. Still referring to Figure 17, located near the bottom of rod 314 there is an interponent 324 that is positionable under the bottom of rod 314 to prevent lowering of the rod and withdrawal of the locking bolt 302, and is also swingable about a pivot 326 to a position where rod 314 can be lowered to withdraw the locking bolt 302. Secured to the lower end of pivot shaft 326 is a wedge-member 328 to which is connected a spring 330 biased to urge the interponent 324 under rod 314. Clockwise movement of pivot shaft 326 to move interponent 324 out from under rod 314 is effected by a bar 332 that is swingable to the left to rotate wedge 328. As described in Freund Patent 2,672,-795 swinging of bar 332 is produced by engagement of the line-follower 29 with line length determining member 26 as the line follower approaches the justification station.

As previously pointed out, movement of the matrix return chute 52 to its lower, element delivery position caused the shaft 280 to be rotated, and this rotation of shaft 280 causes lever 322 to engage shelf 318 and depress rod 314, thereby causing the locking bolt 302 to be withdrawn from the feed rack. Thus as the matrix return chute 52 reaches its lower position, the camera mechanism is started and at substantially the same time the feed rack 27 is unlocked.

When the machine is so used as to collect matrices on the accumulator bar 36, the feed rack is unlocked in the manner described in Freund Patent 2,672,795, that is the upper end of extension 316 of rod 314 is depressed by the accumulator bar plate 34 as the plate moves to its lower position. Thus lowering of the accumulator plate 34 also starts the camera mechanism and unlocks the feed rack 27.

*Cam shaft and mechanisms actuated thereby*

It has been previously pointed out that the present machine makes it possible to re-photograph a composed line of matrices a pre-determined number of time in a fully automatic manner. In order to achieve such automatic operation, the steps of raising the elevator 12, measuring the line shortage, advancing the film after a line has been photographed and retracting the line delivery lever 16, line delivery slide 18 and line follower 20 are effected by a cam shaft and associated mechanism that are best shown in Figures 10 to 13 of the drawings and will now be described.

Referring first to Figure 10, the motor 130 drives not only the pulley 136 but also through a pulley 350, belt 352 and pulley 354 a cam shaft 356. As best shown in Figure 12 of the drawings, the cam shaft 356 carries four clutch elements 358, 360, 362 and 364.

The clutch elements 358 and 364 are not coupled to the shaft, whereas the clutch elements 360 and 362 are keyed to the shaft by a key 366 in such manner that they rotate with the shaft, but may be moved axially thereof to engage the clutch elements 358 and 364 respectively. The clutch elements 360 and 362 are separated by a spacer ring 368 which is secured to the cam shaft 356 by a pin 370 and acts as a stop to limit leftward movement of clutch element 362 and right-ward movement of clutch element 360.

Reverting to Figure 10, axial movement of clutch elements 360 and 362 is effected by means of solenoids. Thus the armature of a solenoid 372 is connected to one end of a yoke 374 that is pivoted on a post 376 and has a pair of arms 378 and 380 that embrace clutch element 362. As shown in Figure 12, the arms 378 and 380 are provided with inwardly extending pins 382 and 384 respectively that ride in an annular external groove 386 of clutch element 362. The clutch element 362 (see also Figure 10) is spring-biased into engagement with spacer ring 368 by a spring 388 connected to the yoke 374 and to a fixed post 387. Thus clutch element 362 engages clutch element 364 only when the solenoid 372 is energized.

In like manner clutch element 360 is actuated by a pair of solenoids 390 and 392 that are connected near one end of a pivoted yoke 394, the other end of which engages an external annular groove 396 in the clutch element 360. When solenoid 390 is energized, clutch element 360 is urged toward spacer ring 368, whereas when solenoid 392 is energized, clutch element 360 is urged into engagement with clutch element 358.

Still referring to Figures 10 and 12, retraction of the line delivery lever and line-follower are effected by engagement of clutch elements 358 and 360. The clutch element 358 is fixed to a small sprocket 398 which is connected by a chain 400 to a large sprocket 402 that is secured to the line delivery lever. Thus when solenoid 392 is energized to cause clutch element 360 to engage clutch element 358 the cam shaft 356 rotates sprockets 398 and 402 to retract the line delivery lever, as well as line delivery slide 18 and line-follower 20. In their retracted positions the line delivery lever, line delivery slide and line-follower are latched by lever 14 (see Figure 1) and thereafter solenoid 390 is energized to positively disengage clutch elements 358 and 360.

The mounting of the line-delivery lever 16 is further shown in Figure 13 of the drawings. Referring to Figure 13, the line delivery lever is mounted for rotation on a shaft 424 and is coupled to the sprocket 402, by rotation of which the line delivery lever is retracted. Line delivery movement of lever 16, as well as of the associated delivery slide 18 and line-follower 20 is effected by means of a spring 426 which becomes operative to move the delivery lever after latch 14 (see Figure 1) has been released by upward movement of the elevator. The line delivery mechanism also includes a camping device 428 secured to the frame of the machine and to an arm 430 of the delivery lever to control damp the velocity of movement of the delivery mechanism.

The raising of elevator 12, the measurement of the line shortage, and the line-advancing movement of the film are all effected by engagement of clutch elements 362 and 364 when solenoid 372 is energized. As will be described in further detail hereafter, the electrical circuit of the machine is so arranged that solenoid 372 remains energized for a sufficient period of time to cause clutch element 364 to be rotated 180° and is then de-energized. Thus solenoid 372 is energized twice for each revolution of clutch element 364.

Referring particularly to Figures 11 and 12 of the drawings, the clutch element 364 has an eccentric 404 formed as part thereof, and there is a cam 406 secured to the eccentric in any suitable manner, such as by the screws 408. Surrounding the eccentric 404 there is a ring 410 having depending therefrom an elevator actuating rod 412.

The manner in which the elevator actuating rod 412 operates elevator 12 is best shown in Figures 13 of the drawings. Referring to Figure 13, the lower end of rod 412 is disposed in a clearance hole (not shown) in a plate 414 that is secured to one end of a lever 416 pivoted on a pin 418. An adjusting nut 419 is provided on the lower end of rod 412 and banks upon the upper surface of plate 414. The purpose of the adjusting nut 419 is to facilitate adjustment of the vertical stroke of elevator 12.

By this construction a line of matrices may be readily removed from the assembling elevator by manually raising the elevator, inserting a composing stick to the position shown in Figure 1, lowering the line into the stick and then withdrawing the stick and line of matrices which will be in a "right reading" relationship as compared to the "wrong reading" relationship which exists when matrices are removed from the accumulator bar 36.

At its forward end lever 416 is pivotally connected to a vertical link 420, the upper end of which is pivotally connected to the bottom of elevator 12. (Only the rear half of elevator 12 is shown in Figure 13.) The construction is such that as eccentric 404 is rotated by cam shaft 356 through clutch elements 362 and 364, the rod 412 moves up or down thereby lowering or raising elevator 12. The elevator is biased toward its upper position by a counterbalance spring 422 connected at its lower end to the lever 416 and at its upper end to the frame of the machine. The strength of spring 422 is such as to permit the assembling elevator, when empty, to gravitate promptly to its lower position.

The electrical circuit of the machine is so arranged that when the starting button 69 (see right side of Figure 1) is depressed, solenoid 372 is energized to cause the cam shaft to rotate clutch element 364 through 180° to raise the elevator to its upper position. When the elevator reaches its upper position, solenoid 372 is de-energized and remains de-energized until the composed line has been delivered to the justification station 24. When the line reaches station 24 the solenoid 372 is again energized to cause the elevator to descend to its lower position, whereupon solenoid 372 is again de-energized. The elevator remains at its lower position while the matrices are photographed and returned thereto and while the delivery slide 18 is retracted. If the cycle controller 61 has been preset for line-repeat operations, the arrival of delivery slide 18 at its retracted position causes solenoid 372 to be again energized to repeat the foregoing cycle.

Reverting now to Figure 11 of the drawing, the cam 406 cooperates with a pair of cam followers 432 and 434 that operate the line-shortage measuring mechanism and line-advancing film mechanism respectively. The cam follower 432 is mounted for rotation at the end of an arm 436 which, as shown in Figure 10 of the drawings, is secured at its other end to a shaft 438 mounted for rotation in a block 440. The shaft 438 is secured to an arm 442 which actuates a film line-advancing mechanism designated 444, only a portion of which is shown in Figure 10. The mechanism for producing the line-advancing movement of the film is disclosed in Freund Patent 2,552,882 and hence is not described in detail herein. The arm 442 is biased upwardly by a spring 446 to hold the cam follower 432 against cam 406.

Still referring to Figures 10 and 11 the cam follower 434 is pivotally mounted at one end of an arm 448 that is pivoted at 450 and connected at its other end to the top of a supporting link 452. As best shown in Figure 18 the link 452 supports one end of an actuating lever 454 for the line-measuring mechanism. The lever 454 is pivoted at 456 and is urged against the bottom of link 452 by a spring 458 which also urges cam follower 434 against cam 406. The other end of lever 454 bears against the underside of an elongated plate 460 having secured to its opposite ends the upwardly extending parallel rods 462 and 464 that are interconnected at their upper ends by the crossbar 466. As fully disclosed in Freund Patents 2,672,795 and 2,645,168 the crossbar 466 supports and actuates a control rail which cooperates with a portion of line-follower 20 to perform the line-measuring operation.

Referring to Figure 11, as well as to Figure 18, when cam-follower 434, during the second half-cycle of shaft 356, moves toward a low point 407 of cam 406, lever 448 rotates about pivot 450 in a direction to permit link 452 to be moved downwardly by action of a spring 458 which is connected to lever 454. The forward end of lever 454 is thus caused to bear against the underside of plate 460 to move the crossbar 466 upwardly to perform the line-shortage measuring operation. As described in Freund Patent 2,672,795 the crossbar 466 is maintained in its upper position by a locking mechanism generally designated 468, which is released to return the crossbar 466 to its lower position by retractive movement of the line-delivery slide 18.

Still referring to Figure 11, the eccentric 404 and cam 406 are shown in the position they occupy just before the machine is started, at which time the elevator is at its lower position. As the machine starts, eccentric 404 and cam 406 are rotated counter-clockwise 180°, thereby raising the elevator. During the first step movement of the eccentric and cam, cam follower 432 drops toward low point 407 of cam 406 to permit arm 436 to be rotated to advance the film one line space. No pivoting movement of lever 448 occurs during this first step.

As pointed out above, when the composed line reaches the justification station 24, clutch element 364 and the associated eccentric 404 and cam 406 are rotated through another 180° which permits the elevator 12 to descend. During this second step, cam follower 434 drops toward low point 407 to permit lever 448 to rotate to actuate the line-shortage measuring mechanism as described above. The surface of cam 404 is provided with a shallow recess 405 which cooperates with one or the other of the followers 432 and 434 to ensure positive positioning of the cam when clutch elements 362 and 364 are disengaged.

*Cycle Controller*

The cycle controller 61 which has been previously referred to in the brief description of the machine is best shown together with its actuating mechanism in Figures 1, 4 and 16 of the drawings. Referring first to Figure 16 the cycle controller comprises in general a counting unit 470 and micro-switch 472. The counting unit 470 comprises three indicating dials 474, 476 and 478 that are individually adjustable by shafts connected to the knurled knobs 480, 482 and 484 respectively. Extending upwardly at the front of the counting unit there is an arm 486 that is positioned to engage a button 488 of micro-switch 472. The construction of the counting unit 470 is such that when all three dials 474, 476 and 478 indicate zero, arm 486 is moved rearwardly to engage and depress the button 488 of micro-switch 472. The micro-switch 472 forms part of an electrical circuit that is described below and when the button 488 is depressed this circuit is broken. Since both the counter 470 and micro-switch 472 may be of conventional construction their internal structure is not shown.

The counting unit 470 is actuated through a rotatable arm 490 which is connected through a link 492 to one end of a lever 494. As indicated in Figure 4, the other end of lever 494 is pivoted to the frame of the machine at 496. The lever 494 is normally positioned in the path of the returning line-follower 20 so that an arm 498 of the line-follower (see also Figure 16) engages and lifts lever 494 when the line-follower is retracted. Thus each time the line-follower and its associated line-delivery lever 16 and line-delivery slide 18 are retracted, the lever 494 and link 492 are raised and arm 490 rotates one or more of the counting dials.

The operation of the cycle controller will be apparent from the description. The indicating dials 474, 476 and 478 are initially set by the knobs 480, 482 and 484 to indicate the number of times it is desired to repeat the photographing of a particular composed line. Thereafter as the rephotographing of the composed line proceeds the number indicated by the counting unit 470 is reduced once for each cycle of the machine. When all of the dials have been returned to zero position, arm 486 depresses button 488 and the actuating circuit of the machine is broken at switch 472 to stop the machine.

*Electrical control circuit*

The electrical control circuit of the present machine is shown in Figure 19 of the drawings. Referring to Figure 19, in order to clarify the circuit diagram various of the operating parts previously described, such as the cam shaft 356 and its associated solenoids, the elevator 12 and delivery slide 18 are diagrammatically shown. In addition to the parts previously described, there are shown in Figure 19 a number of switches which have not previously been referred to and will now be described.

Beginning at the upper left-hand portion of Figure 19 there is a switch 500 (also shown in Fig. 10 near line follower 20) which is actuated by advancing movement of the line-delivery mechanism and is so positioned that it is closed by the line-delivery mechanism as the last matrix of the composed line moves upwardly to the photographing station. Nearby there is shown a switch 502 (see also Figure 4) which is also actuated by the line-delivery mechanism through intermediate mechanisms and is so positioned that it is closed just as the composed line reaches the justification station 24. At the upper right-hand portion of Figure 19 there is a pair of switches 504 and 506 which are operated by the line-delivery slide 18 and are closed when the delivery slide is in its extreme retracted position. The switches 504 and 506 open as soon as the line-delivery slide 18 begins its line-delivery movement. Switches 504 and 506 are also shown at the right-hand side of the machine as illustrated in Figure 1 of the drawings.

Referring next to the lower-central portion of Figure 19, a pair of elevator limit switches 508 and 510 are illustrated which are operated by portions of the elevator mechanism. The switch 508 remains closed unless the elevator is in its upper position, whereupon switch 508 is opened. In like manner switch 510 is closed unless the elevator is in its lower-most position.

At the lower right-hand portion of Figure 19 there is illustrated a hold-in relay 512 having a coil 513 and contacts 514 and 516. Near the hold-in contact 514 and in series therewith there is a switch 60 which was previously referred to in the brief description of the machine. Switch 60 is manually closed when line-repeat operation is desired and open when it is desired to photograph a composed line only once.

Still referring to the lower right portion of Figure 19, power to operate the machine is supplied through a pair of conductors 520 and 522 which lead to the motor 130 and energize the motor as soon as the starting switch 59 (see also Figure 1) has been closed. The starting circuit of the machine includes in addition to the push-button switch 69, previously referred to, a branch conductor 524 extending from conductor 522 to the switch 69 and a conductor 526 interconnecting switch 69 and coil 513. To complete the circuit relay coil 513 is connected through conductors 528 and 530 with main conductor 520. Thus it is evident that when the push-button of switch 69 is depressed relay 512 is energized to close contacts 514 and 516. Moreover assuming switch 60 is closed for line-repeat operation, the push-button 69 can be released and relay 512 will remain energized through a hold-in circuit that includes contact 514, switch 60, a conductor 532, switch 472 and a conductor 534 that is connected near the upper left corner of Figure 19 to main conductor 522.

When contacts 516 are closed by relay 512, current may flow from main conductor 520 through branch conductor 530, a conductor 536, switch 506, a conductor 538, switch 508 and a conductor 540 to solenoid 372. The energizing circuit for solenoid 372 is completed by branch conductor 542 which interconnects the solenoid and main conductor 522. Thus solenoid 372 is energized as soon as starting button 69 is depressed.

When the solenoid 372 is energized it causes clutch elements 362 and 364 to be engaged as previously described, and the cam shaft 356 turns eccentric 404 and cam 406 through 180°, thereby producing a line-advancing movement of the film and also raising elevator 12 to its upper position. As the elevator 12 starts upwardly switch 510 is closed; and when the elevator reaches its uppermost position, switch 508 is opened, thereby breaking the circuit to solenoid 372 and permitting spring 386 to withdraw clutch element 362, thereby stopping the rotation of clutch element 364.

As pointed out above, when the elevator 12 reaches its upper position, it releases mechanically the line-delivery slide 18 and its associated parts which push the composed line left-ward to the justifying station 24. As slide 18 starts its line-delivery movement the switches 504 and 506 are opened.

When the line-delivery mechanism and more particularly line-follower 20 reaches the justification station 24, the switch 502 is closed. The closing of switch 502 completes an energizing circuit for solenoid 372 as follows: Current from main conductor 520 flows through conductor 530, contacts 516, a branch conductor 544, switch 510, conductor 546, switch 502, conductor 548, conductor 540, solenoid 372 and conductor 542 back to main conductor 522. Thus solenoid 372 is energized again to cause clutch 362 to engage clutch element 364 and rotate it through another 180°. The second step rotation of clutch element 364 causes cam 406 to actuate the line-shortage mechanism as previously described and also lowers elevator 12, thereby permitting closure of the upper elevator limit switch 508 and, when the elevator reaches its lower-most position, opening switch 510 and breaking the energizing circuit of solenoid 372.

As previously described, when the elevator 12 approaches its lower position it unlatches, by rotation of lever 56 the chute 52, which is then swung by spring 65 (see Figure 10) to its element delivery position. At the same time the camera starting mechanism is actuated to start the photographing operation. The elements are photographed individually as has been described and are individually returned by means of the conveyor belt 50 and chute 52 to the elevator 12 in proper order for rephotographing.

As the last element of the composed line is raised to photographing position, the line delivery mechanism closes switch 500, thereby completing an actuating circuit for the solenoid 392 as follows: Conductor 520, conductor 530, a conductor 550, switch 500, a conductor 552, solenoid 392 and conductor 522. When solenoid 392 is energized it causes clutch element 360 to engage clutch element 358, thereby driving sprocket 398 to return line-delivery lever 16, delivery slide 18 and line-follower 20 to their retracted positions. As the retractive movement of the line-delivery mechanism starts, switch 500 is opened to break the energizing circuit of solenoid 392. However, there is no biasing spring on this solenoid and hence the clutch elements 358 and 360 remain engaged.

As retractive movement of the line delivery mechanism continues, counter 61 is actuated, chute 52 is unlatched and raised to its retracted position and the line delivery mechanism is latched by lever 14 in its retracted position, at which position it closes switches 504 and 506. Also as the line delivery mechanism reaches its latching position switch 502 is opened. The closure of switch 504 completes an energizing circuit for solenoid 390 as follows: Conductor 520, conductor 530, conductor 550, switch 504, conductor 554, solenoid 390, conductor 556 and main conductor 522. The energizing of solenoid 390 causes clutch element 360 to be disengaged from clutch element 358, thereby stopping the driving mechanism that returns the line-delivery lever and its associated parts to their retracted position. Solenoid 390 remains energized until its energizing circuit is broken by the opening of switch 504 on the next advancing movement of the line delivery slide 18.

When the switch 504 is closed by the retractive movement of line-delivery slide 18, switch 506 is also closed, thus again completing an energizing circuit for solenoid 372 through the upper limit switch 508 of elevator 12 and a new cycle of operations as described above is initiated. This cycle is repeated until the dials of counter 61 all register zero, whereupon as described above the switch 472 is opened, thus breaking the holding circuit through conductors 532 and 534 and de-energizing relay 512. When relay 512 becomes de-energized, contact 516 opens and breaks the control circuit, thereby stopping the machine.

*Operation*

The operation of the present machine should be apparent from the foregoing description, but for convenience the operations that occur during one cycle of the machine will now be summarized in outline form.

Before the machine is started it is adjusted as described under the heading "Brief Description of Machine" for the point size of type and line length that is desired. A composed line of matrices is inserted in elevator 12, switch 60 is set for repeat or single operation, and the starting button 69 is depressed, whereupon the following operations occur in the indicated sequence.

1. Elevator 12 is automatically raised to its upper position.

2. During the rise of elevator 12 the film is automatically advanced one line space.

3. At its upper position elevator 12 unlatches the line delivery lever 16, delivery slide 18 and line-follower 20.

4. The line-follower moves the line of matrices from elevator 12 along the delivery channel to justifying station 24.

5. When the line of matrices reaches justifying station 24, elevator 12 descends.

6. During the descent of the elevator, the line shortage is measured at the justifying station by justifying mechanism 28.

7. Just before elevator 12 reaches its lower position it unlatches chute 52, and the chute is rotated by a spring to its element delivery position.

8. Movement of chute 52 to its element delivery position unlocks feed rack 27 and starts the camera mechanism.

9. The matrices are photographed one-by-one, and returned by conveyor 50 and chute 52 to the elevator 12.

10. As the last matrix is moved to photographing position, the line delivery lever retracting mechanism is actuated to retract the line delivery lever 16, delivery slide 18, and line-follower 20.

11. During retraction of the delivery lever 16 (a) switch 500 is opened, (b) the justifying mechanism lock 468 is released, (c) feed rack 27 is retracted, (d) the film holder 32 is raised, (e) chute 52 is unlatched, (f) chute 52 is rotated to its retracted position, thereby locking feed rack 27 and stopping the camera mechanism, (g) switch 502 is opened, (h) switches 504 and 506 are closed, (i) the delivery slide and lever are latched in their retracted positions by latch lever 14.

12. If the cycle controller is set for another photographing cycle, the elevator 12 is automatically raised to initiate another cycle of the foregoing operations, whereas if the counter dials of the cycle controller register zero the machine stops.

From the foregoing description it should be apparent that the present invention provides apparatus capable of achieving the several objectives outlined at the beginning of the specification. Once the machine has been set to re-photograph a composed line a predetermined number of times, it is only necessary to press the starting button and thereafter the machine carries out the desired number of line-repeat operations in a fully automatic manner. Thus the present machine prevents substantially advantages in terms of labor saving over prior machines wherein it was necessary for an operator to perform certain manual operations each time a composed line of elements was re-photographed. With the present machine the apparatus can be set for the desired number of repeat operations and the operator can occupy himself with other matters while these line-repeat operations are being automatically performed by the machine.

It is of course to be understood that the foregoing description is illustrative only and that numerous changes can be made in the preferred embodiment described without departing from the spirit of the invention as defined in the appended claims.

I claim:

1. In a photocomposing machine of the type wherein a composed line of elements bearing photographable characters is assembled in an assembly device that is movable from a line-assembly position to a line-delivery position and the composed line is moved laterally from the line delivery position of said assembly device to a justification station and the elements of said line are then individually and successively moved upwardly first to a photographing station for photographing and then to a discharge station; apparatus for returning the elements of said line to said assembly device in proper order for re-photographing comprising in combination, an endless belt extending from said discharge station to a point substantially above said assembly device, a chute pivotally mounted near said endless belt, said chute being positioned to receive elements from said endless belt and being swingable between an element delivery position adjacent to said assembly device and an inactive position substantially spaced from said assembly device, biassing means associated with said chute for biassing it toward its element delivery position, and a latch for retaining said chute in its inactive position, said latch being engaged by said assembly device as it moves toward said line delivery position and released by said assembly device as said device moves toward its line-assembly position to cause said biassing means to swing said chute to its element delivery position.

2. In a photocomposing machine of the type wherein a composed line of elements bearing photographable characters is assembled in an elevator that is movable from a lower line-assembly position to an upper line-delivery position and the composed line is moved laterally from the upper position of said elevator to a justification station and the elements of said line are then individually and successively moved upwardly first to a photographing station for photographing and then to a discharge station; apparatus for returning the elements of said line to said elevator in proper order for re-photographing comprising in combination, an endless belt extending from said discharge station to a point substantially above said elevator, a chute pivotally mounted near said endless belt, said chute being positioned to receive elements from said endless belt and being swingable between an element delivery position adjacent to said elevator and an inactive position substantially spaced from said elevator, spring means associated with said chute for resiliently urging it toward said element delivery position and a latch for retaining said chute in its inactive position, said latch being engageable by said elevator and released by downward movement thereof.

3. In a photocomposing machine of the type wherein a composed line of elements bearing photographable characters is assembled in an elevator that is movable from a lower line-assembly position to an upper line-delivery position and the composed line is moved laterally by a line follower from the line of delivery position of said elevator to a justification station and the elements of said line are then individually and successively moved upwardly first to a photographing station for photographing and then to a discharge station; apparatus for returning the elements of said line to said elevator in proper order for re-photographing comprising in combination, an endless belt extending from said discharge station to a point substantially above said elevator, a chute pivotally mounted near said endless belt, said chute being positioned to receive elements from said endless belt and being swingable between an element delivery position adjacent to said assembly device and an inactive position substantially spaced from said assembly device, spring means associated with said chute for urging it resiliently toward its element delivery position and a latch for retaining said chute in its inactive position, said latch being released by downward movement of said elevator to cause said spring means to swing said chute to its element delivery position and said line follower having a part positioned to engage said chute whereby upon retraction of said line follower after delivery of the composed line to said justification station said part returns said chute to its inactive position.

4. In a photocomposing machine of the type wherein a composed line of elements bearing photographable characters is assembled in an elevator that is movable from a lower line-assembly positioned to an upper line-delivery position and the composed line is moved laterally by a line follower from the line-delivery position of the elevator to a justification station and the elements of said line are then individually and successively moved upwardly first to a photographing station for photographing and then to a discharge station, apparatus for causing a line of elements to be rephotographed comprising in combination an endless belt extending from said discharge station to a point substantially above said elevator, a chute mounted near said endless belt, said chute being positionable to receive elements from said endless belt and deliver them to said elevator in proper order for rephotographing, motor means for driving said belt, and mechanism for periodically connecting said motor means to said elevator to raise it to its upper position for delivery of a line and to lower it to its line-assembly position.

5. In a photocomposing machine of the type wherein a composed line of elements bearing photographable characters is assembled in an elevator that is movable from a lower line-assembly position to an upper line-delivery position and the composed line is moved laterally by a line follower from the line-delivery position of the elevator to a justification station and the elements of said line are then individually and successively moved upwardly first to a photographing station for photographing and then to a discharge station, apparatus for causing a line of elements to be rephotographed comprising in combination, an endless belt extending from said discharge station to a point substantially above said elevator, a chute mounted near said endless belt, said chute being positionable to receive elements from said endless belt and deliver them to said elevator in proper order for rephotographing, motor means for driving said belt, cam mechanism for raising and lowering said elevator, a clutch operable to connect said motor means and said cam mechanism, and means actuated by movement of said line follower for periodically operating said clutch to raise and lower said elevator.

6. In a photocomposing machine of the type wherein a composed line of elements bearing photographable characters is assembled in an elevator that is movable from a lower line-assembly position to an upper line-delivery position and the composed line is moved laterally by a line follower from the line-delivery position of the elevator to a justification station and the elements of said line are then individually and successively moved upwardly first to a photographing station for photographing and then to a discharge station, apparatus for causing a line of elements to be rephotographed comprising in combination, an endless belt extending from said discharge station to a point substantially above said elevator, a chute mounted near said endless belt, said chute being positionable to receive elements from said endless belt and deliver them to said elevator in proper order for rephotographing, motor means for driving said belt, cam mechanism for raising and lowering said elevator, a clutch operable to connect to said motor means and said cam mechanism, first and second switch means controlling the operation of said clutch, said first switch being actuated by retractive movement of said line follower to cause said motor means, clutch, and cam mechanism to raise said elevator and said second switch being actuated by advancing movement of said line follower to cause said motor means, clutch and cam mechanism to lower said elevator.

7. In a photocomposing machine of the type wherein a composed line of elements bearing photographable characters is assembled in an elevator that is movable from a lower line-assembly position to an upper line-delivery position and the composed line is moved laterally by a line follower from the line delivery position of the elevator to a justification station and the elements of said line are then individually and successively moved upwardly first to a photographing station for photographing and then to a discharge station, apparatus for causing a line of elements to be rephotographed a predetermined number of times, comprising in combination, an endless belt extending from said discharge station to a point substantially above said elevator, a chute mounted near said endless belt, said chute being positionable to receive elements from said endless belt and deliver them to said elevator in proper order for rephotographing, motor means for driving said belt, mechanism for periodically connecting said motor means to said elevator to raise it to its upper position for delivery of a line to said justification station and to lower said elevator to its line assembly position, a line repeat cycle controller including a counter actuated each time a line is rephotographed, setting means for setting the controller for a predetermined number of line repeat cycles, and cycle interrupting means for interrupting the operation of said periodic mechanism when said predetermined number of line repeat cycles has been completed.

8. In a photocomposing machine of the type wherein a composed line of elements bearing photographable characters is assembled in an elevator that is movable from a lower line-assembly position to an upper line-delivery position and the composed line is moved laterally by a line follower from the line-delivery position of the elevator to a justification station and the elements of said line are then individually and successively moved upwardly first to a photographing station for photographing and then to a discharge station, apparatus for causing a line of elements to be rephotographed a predetermined number of times, comprising in combination, an endless belt extending from said discharge station to a point substantially above said elevator, a chute mounted near said endless belt, said chute being positionable to receive elements from said endless belt and deliver them to said elevator in proper order for rephotographing, motor means for driving said belt, cam mechanism connected to said elevator for raising and lowering it, a clutch operable to connect to said motor means and said cam mechanism to raise or lower said elevator, means actuated by movement of said line follower for periodically operating said clutch to raise and lower said elevator, a line repeat cycle controller including a counter actuated each time a line is rephotographed, setting means for setting the counter for a predetermined number of line repeat cycles, and cycle interrupting means for inactivating said clutch operating means when said predetermined number of line repeat cycles has been completed.

9. In a photocomposing machine of the type wherein a composed line of elements bearing photographable characters is assembled in an elevator that is movable from a lower line-assembly position to an upper line delivery position and the composed line is moved laterally by a line follower from the line-delivery position of the elevator to a justification station and the elements of said line are then individually and successively moved upwardly first to a photographing station for photographing and then to a discharge station, apparatus for causing a line of elements to be rephotographed a predetermined number of times, comprising in combination, an endless belt extending from said discharge station to a point substantially above said elevator, a chute pivotally mounted near said endless belt, said chute being positionable to receive elements from said endless belt and deliver them to said elevator in proper order for rephotographing, motor means for driving said belt, cam mechanism for raising and lowering said elevator, a clutch operable to connect said motor means to said cam mechanism to raise or lower said elevator, first and second switch means controlling the operation of said clutch, said first switch means being actuated by retractive movement of said line follower to cause said motor means to raise said elevator and said second switch being actuated by advancing movement of said line follower to cause said motor means to lower said elevator, a line-repeat cycle controller including a counter actuated each time a line is rephotographed, setting means for setting the counter for a predetermined number of line-repeat cycles, and a third switch connected in circuit with said first and second switches and adapted to break said circuit when said predetermined number of line-repeat cycles has been completed.

10. In a photocomposing machine of the type wherein a composed line of elements bearing photographable characters is assembled in an elevator that is movable from a lower line-assembly position to an upper line-delivery position and the composed line is moved laterally by a line follower from the line of delivery position of said elevator to a justification station and the elements of said line are then individually and successively moved upwardly first to a photographing station for photographing and then to a discharge station; apparatus for returning the elements of said line to said elevator in proper order for re-photographing comprising in combination, an endless belt extending from said discharge station to a point substantially above said elevator, a chute pivotally mounted near said endless belt, said chute being positioned to receive elements from said endless belt and being swingable between an element delivery position adjacent to said assembly device and a retracted position substantially spaced from said assembly device, spring means associated with said chute for urging it toward its element delivery position, said line follower having a part adapted to engage said chute when said line follower is retracted after delivery of a composed line to move said chute to its retracted position, a latch positioned in the path of said chute and slightly spaced from the retracted position of said chute whereby when said line follower moves laterally to deliver a composed line to the justification station said chute moves into contact with said latch and is retained thereby approximately at its retracted position until delivery of said composed line has been completed, said latch being released by descending movement of said elevator to cause said spring means to swing said chute to its element delivery position.

11. In a photocomposing machine of the type wherein a composed line of elements bearing photographable characters is assembled in an elevator that is movable from a lower line-assembly position to an upper line delivery-position and the composed line is moved laterally by a line follower from the line-delivery position of the elevator to a justification station and the elements of said line are then individually and successively moved upwardly first to a photographing station for photographing and then to a discharge station, apparatus for causing a line of elements to be rephotographed a pre-determined number of times, comprising in combination, an endless belt extending from said discharge station to a point substantially above said elevator, a chute pivotally mounted near said endless belt, said chute being positionable to receive elements from said endless belt and deliver them to said elevator in proper order for rephotographing, motor means for driving said belt, cam mechanism for raising and lowering said elevator, a solenoid-operated clutch for selectively connecting said motor means to said cam mechanism to raise or lower said elevator, an electrical control circuit for energizing the solenoid to operate said clutch, said circuit including first and second switch means comprising an upper limit switch positioned to be engaged and opened by said elevator as it approaches its line delivery position and a lower limit switch positioned to be engaged and opened by said elevator as it approaches its line assembly position.

12. A photocomposing machine according to claim 11 and wherein said electrical control circuit includes third and fourth switch means, said third switch means being engaged and closed by said line follower as it reaches its retracted position to energize said solenoid and thereby cause said elevator to be raised, and said fourth switch means being closed by advancing movement of said line follower to energize said solenoid and thereby cause said elevator to descend.

13. A photocomposing machine according to claim 12 and including a cycle controller and a fifth switch means connected in said electrical control circuit, said fifth switch means being positioned to be opened by said cycle controller when a predetermined number of line repeat operations have occurred.

References Cited in the file of this patent

UNITED STATES PATENTS 2,704,014     Freund _____ Mar. 15, 1955